United States Patent [19]

Evans

[11] 4,013,556
[45] Mar. 22, 1977

[54] COMBINATION FLOW DISTRIBUTION AND COLLECTION APPARATUS

[75] Inventor: Thomas W. Evans, Houston, Tex.
[73] Assignee: UOP Inc., Des Plaines, Ill.
[22] Filed: Aug. 19, 1976
[21] Appl. No.: 715,814
[52] U.S. Cl. .............................. 210/136; 210/289; 210/291
[51] Int. Cl.² ........................................ B01D 23/20
[58] Field of Search ............... 210/136, 289, 291

[56] References Cited

UNITED STATES PATENTS

| 273,539 | 3/1883 | Hyatt | 210/136 |
|---|---|---|---|
| 377,390 | 2/1888 | Jewell | 210/136 |
| 418,335 | 12/1889 | Jewell | 210/136 |
| 3,247,968 | 4/1966 | Miller | 210/136 |
| 3,279,610 | 10/1966 | Scholten et al. | 210/289 X |
| 3,322,284 | 5/1967 | Moore | 210/289 X |
| 3,384,240 | 5/1968 | Berardi | 210/136 |
| 3,395,099 | 7/1968 | Johnson | 210/136 X |
| 3,747,768 | 7/1973 | Barrera | 210/289 X |

Primary Examiner—Frank A. Spear, Jr.
Assistant Examiner—Richard W. Burks
Attorney, Agent, or Firm—James R. Hoatson, Jr.; Barry L. Clark; William H. Page, II

[57] ABSTRACT

Combination flow distributing and collecting apparatus for collecting and distributing fluids at different flow rates includes at least one cylindrical screen member portion having a cylindrical distribution and collection pipe positioned interiorly thereof. The distribution and collection pipe contains a plurality of openings in its sides, with at least some of the openings serving to permit flow in one radial direction while restricting or preventing flow in the other radial direction while the other openings permit flow in either direction.

8 Claims, 6 Drawing Figures

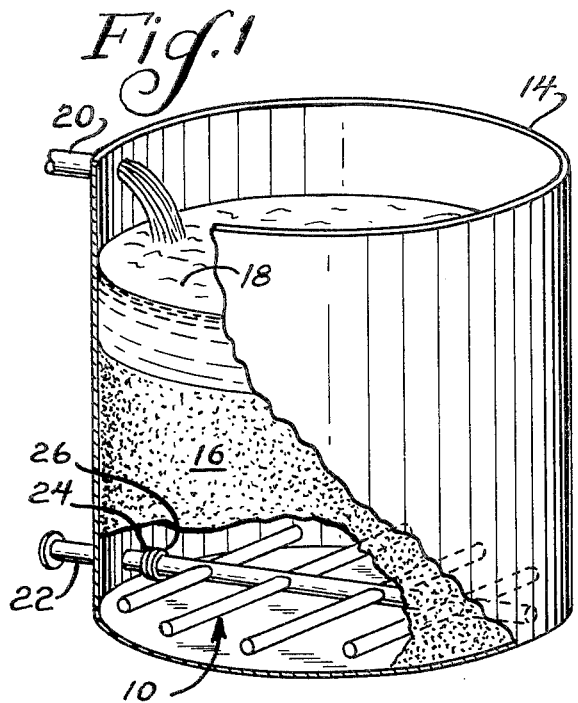
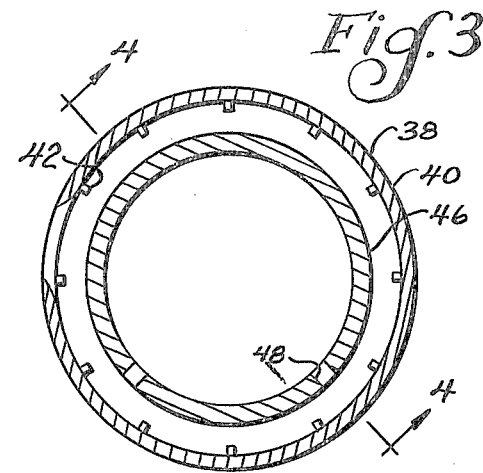
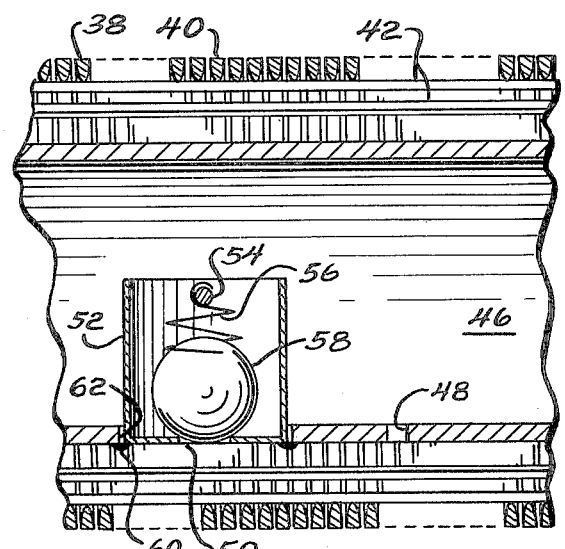
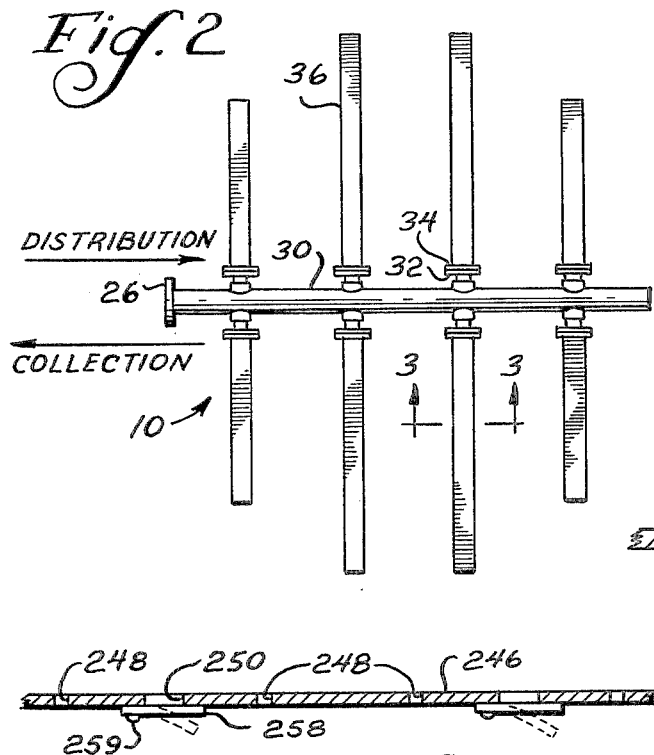

COMBINATION FLOW DISTRIBUTION AND COLLECTION APPARATUS

BACKGROUND OF THE INVENTION

The invention relates to flow collection and distribution systems. One example of the many uses for such systems is in demineralizers where water to be used as boiler feed stock is treated by passing it downwardly in a vessel through a bed of deionizing resin beads which remove the minerals. The treated water or other fluid is typically collected at the bottom of the bed in a "Header-Lateral" comprising a parallel array of horizontal "lateral" perforated screens which branch out from a central manifold pipe or "header" to substantially cover the entire cross-section of the vessel.

In many applications, the screen system is used not only to collect treated fluid which has trickled down through the bed but also to distribute fluid, such as a dilute solution of $H_2SO_4$, which percolates upward through the bed for regeneration purposes. Typically, each lateral consists of a pipe containing a plurality of drilled or cast holes in its wall which is installed within a cylindrical screen of the type commonly used in water wells. The number, location and size of the holes in the pipe determine the flow rate and the distribution for the incoming or outgoing fluid flow. The screen must, of course, have a mesh small enough to prevent the passage of the resin beads or other solid material to which the laterals are exposed.

Where preferred flow rates in either direction are generally identical, it is, of course, possible to provide appropriate outlet and inlet valves for alternatively connecting a particular header-lateral system to either a collection pipe or to a source of regeneration liquid. Where preferred flow rates are substantially different, such as the common situation where the regeneration flow rate is preferably far less than the collection rate, it is not possible to use the same system for both collection and distribution. This is so since it is desired that the regeneration liquid be uniformly dispersed at a uniform rate throughout the cross-section of the bed. Obviously, if one merely reduced the regenerant input flow rate in a system having holes sized for the greater flow rate required during collection, the flow would be greater through the holes closest to the liquid source than those further away if in fact any fluid reached the distant holes and the bed would not be uniformly regenerated.

One solution which achieves uniform collection and distribution is to place a distribution pipe system concentrically inside a collection pipe system with each system having holes sized for its intended flow rate. Another solution is to provide completely separate collection and distribution systems with each being sized for a particular flow rate. Obviously, these latter solutions are expensive. Furthermore, they consume a considerable amount of space in the bed and produce a certain amount of interference with flow. Where separate systems are used, there is a problem of being able to locate each on the bottom of the bed.

SUMMARY

It is among the objects of the present invention to provide a combination flow distribution and collection system for fluids which accommodates greater flow in one flow direction than another. It is a further object of the invention to provide a compact and ecomomical flow distribution and collection system. These and other objects and advantages are provided by the system of the present invention which comprises an array of perforated pipes positioned interiorly of cylindrical screen members. A first set of unobstructed perforations or openings in the pipe walls is sized and located so as to provide a desired flow volume and distribution in a first direction of flow. A second set of perforations is also located in the pipe walls but the perforations are closed by one-way valve means in a first direction of flow. However, in the second or reverse direction of flow, the one-way valves permit flow through the second set of perforations and this flow, combined with the reverse flow through the first set of perforations, can be much greater than the flow in the first direction. Thus, it is possible, for example, to have inward flow at a high rate into the pipe through both sets of openings when liquid is being collected after having passed through a bed of deionization resins. Conversely, when the bed is being regenerated, liquid can flow at a low rate in the reverse direction and yet still be uniformly distributed under pressure across the entire bed cross section since the flow can take place only through the first set of openings. The reason for the differences in flow rates is that during collection it is desirable to treat as much liquid as possible. During regeneration, where expensive acid or other regenerating chemicals are being percolated through the bed, it is obviously most economical to distribute a minimum amount of regenerating liquid into bed. In a typical situation, one might pump and collect water in a downward direction at 1500 gpm. for about 24 hours and then pump and distribute acid at 150 gpm. for about 30 minutes to regenerate the resin. The bed would then be back-flushed in a downward direction at perhaps 1300 gpm. to eliminate the acid before another collection step took place. Appropriate valves positioned externally of the top and bottom of the tank would, of course, control the flow and discharge disposition of the various liquids and keep them properly segregated. The materials used for the various components would be determined by the liquids flowing in contact with them.

BRIEF DESCRIPTION OF THE DRAWINGS

FIG. 1 is a partially broken away perspective view of a demineralizer vessel;

FIG. 2 is a top view of the improved collection and distribution apparatus;

FIG. 3 is a side sectional view of a lateral member taken on line 3—3 of FIG. 2;

FIG. 4 is an axial sectional view taken on line 4—4 of FIG. 3 of a portion of a lateral having an inward flow rate grreater than its outward flow rate;

FIG. 5 is an axial sectional view similar to FIG. 4 but showing a modification wherein the outward flow rate is greater than the inward flow rate; and FIG. 6 is an axial sectional view similar to FIG. 5 but showing a modification utilizing a different form of one-way valve.

DESCRIPTION OF THE PREFERRED EMBODIMENT

Referring to FIG. 1, the improved header-lateral assembly indicated generally at 10 is shown in a typical position in which it might be placed in a tank or vessel 14. The particular tank arrangement shown in one which might be used in a demineralization operation wherein the tank is approximately 75% filled with a bed 16 of small beads of a deionizing resin. Such a demineralizing unit could be used for many purposes, but one common one is to remove minerals from well water which is used as a boiler feed stock. Typically, is such a use, the water 18 to be treated would enter the tank 14 through an upper pipe 20 which passes through the wall of the tank. The pipe 20 would be connected externally of the tank by valve means (not shown) to a supply of water to be treated or to be used for backflushing or to a reservoir for receiving regenerating liquids which may be percolated up through the bed 16 on a periodic basis to regenerate the resin beads. In a collection mode, the water 18 entering the tank 14 through the pipe 20 passes downwardly through the bed 16 of resin beads and is collected at the bottom of the bed by the header-lateral assembly 10 which is connected to an outlet pipe 22 by means of a flange 24 on the outlet pipe and a cooperating flange 26 on the header-lateral assembly 10.

Referring to FIG. 2, the header-lateral assembly 10 can be seen as comprising a straight pipe or header portion 30 which is closed except for the entrance opening of the flange 26 and the openings which are surrounded by the header flanges 32. The header flanges 32 are preferably connected by bolts or other means to lateral flanges 34 on a plurality of lateral members 36 which extend parallel to each other and have varying lengths depending upon the size of the vessel 14 into which they are placed so that they uniformly cover the cross section of the vessel 14. The laterals 36 each comprise an outer screen portion 38 (FIG. 3) of the type typically found in well screens wherein a formed wire 40 is wrapped around and welded to a plurality of support rods 42. A cylindrical pipe member 46 is positioned within each screen 38 and affixed thereto such as by being welded to the flange 34. The pipe portion 46 includes a plurality of small openings 48 which are preferably arranged at spaced distances along its length. These holes 48 are preferably arranged in two rows at 90° to each other and equally spaced about the vertical center plane of the pipes as shown in FIG. 3. The size of the small openings 48 and the number of them which are utilized in each pipe is determined by the flow rate which it is necessary to achieve when the assembly 10 is being used to distribute dilute acid or other regenerating liquid into the bed 16.

Whereas the holes 48 must be uniformly spaced along the lengths of each lateral 36 if uniform regeneration is to be achieved, such uniform spacing is not necessary during the collection operation where the entire bed is resting in liquid such that liquid fills the space between the screen 38 and the pipe 46. Thus, for collection purposes the openings 50 can be substantially larger than the holes 48 and be much fewer in number. For example, if flow into the pipes 46 during the collection stage of operation is to be ten times the flow out of the pipes 46 in a regeneration operation, then the total number of large openings 50 required and their size would be such that 9 parts of water could flow through them to each part flowing through all of the openings 48.

Although many types of one-way valve devices could be used to block flow through the openings 50 in one direction, one relatively simple type is shown in FIG. 4 wherein a small valve tube or cylinder 52 is shown as having a retaining pin 54 and a retaining spring 56 positioned therein so as to bias a ball 58 against the edges of the openings 50. The valve cylinders 52 can be welded as shown at 60 into relatively large openings 62 formed in the wall of the pipe portions 46.

The modification shown in FIG. 5 is exactly the same as that discussed with respect to FIG. 4 with the parts 146-158 being identical to the corresponding parts 46-58. The only difference between the two embodiments is that if FIG. 5 the valve cylinder 152 is positioned upside down in the pipe relative to the FIG. 4 placement. Thus, the FIG. 5 embodiment would apply to a situation wherein it was desired that greater flow be able to take place out of the pipe 46 than into it.

FIG. 6 represents a modification of the valve structure shown in FIG. 5 in that the valve structure 150-158 of FIG. 5 is replaced by a flapper valve 258 mounted by rivets or other means 259 to the pipe wall 246. The flapper valve 258 may be made of any material compatible with the liquids being circulated through the system but might comprise a synthetic rubber or a thin sheet of stainless steel, for example. The small openings 248 and the large openings 250 correspond to the openings 148, 150 respectively.

Although, for simplicity, the header-lateral assembly 10 has been shown in FIG. 1 as being mounted in an open top atmospheric tank or vessel 14, it should be noted that it would be more common to mount the assembly in a pressure vessel, such as one having cylindrical walls and a domed or hemispherically shaped top and bottom. Obviously, the assembly 10 would work the same in either a pressurized or unpressurized vessel.

I claim as my invention:

1. An apparatus for distributing fluid flow in one direction at one flow rate and collectng it in another direction at another flow rate comprising pipe means having an opening at one end through which fluid can enter or leave said apparatus and first and second sets of openings in the walls thereof, the first said set of openings permitting flow in either direction through said walls depending on whether the fluid is being distributed or collected, the second said set of openings having valve means associated therewith which are self-closing in one direction of flow and self-opening in the other direction of flow, and perforated screen means concentrically positioned about said pipe means for preventing solid particles in the fluid being collected which are larger than the screen perforations from being drawn into the pipe means.

2. The apparatus of claim 1 wherein said pipe means and screen means are attached to a header member at spaced locations along the length thereof.

3. The apparatus of claim 1 wherein said valve means associated with said second set of openings are attached to said pipe means and include portions which overlie and close off said second set of openings in an outward direction of flow.

4. The apparatus of claim 3 wherein said valve means each comprise a ball and resilient means to bias the ball into sealing contact with one of said second set of openings.

5. The apparatus of claim 1 wherein the number of openings in the second set of openings and their size is selected to permit a flow rate through the pipe in their open direction which is at least twice the flow rate through the pipe in their closed direction.

6. The apparatus of claim 1 wherein the number of openings in the second set of openings and their size is selected to permit a flow rate through the pipe in their open direction which is at least five times the flow rate through the pipe in their closed direction.

7. The apparatus of claim 1 wherein said valve means associated with said second set of openings are attached to said pipe means and include portions which overlie and close off said second set of openings in an inward direction of flow.

8. The apparatus of claim 1 wherein said valve means comprise flapper valves.

* * * * *